Patented Mar. 12, 1946

2,396,621

UNITED STATES PATENT OFFICE 2,396,621

PRODUCTION OF POLYMER LAYERS

Kurt Thinius, Eilenburg, Germany; vested in the Alien Property Custodian

No Drawing. Application March 29, 1943, Serial No. 481,019. In Germany October 5, 1940

1 Claim. (Cl. 260—29)

The present invention relates to polymer layers and more particularly to a process of producing layers from polyurethanes.

The polyurethanes generally prepared by condensing diisocyanates with polyhydric alcohols and characterized by the recurring structural unit

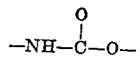

have a very low solubility and are insoluble in all usual solvents at ordinary temperature. Some relatively high-boiling ketones, ketone alcohols and aromatic or hydroaromatic alcohols dissolve the polyurethanes at boiling temperature or a temperature in a relatively narrow interval near the boiling point. Since this interval is near the melting point of the polyurethanes, the working up thereof by means of these solvents is not of advantage especially because all solutions prepared in the heat are unstable and precipitate the polyurethane in the form of a swollen powder already shortly after exceeding the critical solution temperature.

As has been found, chloroalcohols are solvents with an especially high dissolving power for polyurethanes. Already within a range of temperature being considerably below the melting interval preferably between 95 and 115° C. the chloroalcohols rapidly dissolve the polyurethanes and form a clear solution of a high stability. The solution can be cooled to a temperature below 95° C. for some time without precipitating the polyurethane. The polyurethane solutions can be worked up in this supercooled condition into any layers or articles. However, for the production of polyurethane layers with especially valuable properties it is advantageous to work up the solutions at about the same temperature as the polyurethane has been dissolved.

I have furthermore found that within the whole solution interval, depending on the used chloroalcohol, there is again a range of temperature which when kept yields finished articles with optimum properties.

The polyurethanes may be dissolved in the chloroalcohols in any proportions. The liquid to pasty masses may be applied on supports of any kind and used with or without them after removing the excess solvent. Before, during or after dissolving the polyurethanes plasticizers, filling agents, pigments, soluble dyestuffs, and other substances as, for instance, fish silver and metal powder may be added thereto. It is also possible first to apply the mixture of polyurethane and chloroalcohol on the desired support, if required together with the addition substances mentioned above, and then to transform the polyurethane into the film-forming condition through the intermediate stage of the solution or paste. Of the chloroalcohols β-chloroethanol and trichloroisobutanol are especially suited.

The more detailed practice of the invention is illustrated by the following examples. There are, of course, many forms of the invention other than these specific embodiments.

Example 1

Polyurethane prepared by condensing α-ω-hexanediisocyanate with 1.4-butylene glycol with polymerization and melting at 188–190° C. is dissolved in ethylenechlorohydrin to a solution of 20% strength at a bath temperature of 105° C. The clear viscous solution is applied on glass, metal, stone, beton or wood by means of a preheated apparatus such as a spraying pistol. A smooth transparent coating is obtained on the surface.

In applying the polyurethane solution attention is to be paid to that the temperature thereof does not exceed the temperature range mentioned above due to the heating of the spraying pistol. In fact, it could be observed that a solution of the polyurethane heated to the boiling point (122–129° C.) of ethylene-chlorohydrin results in articles having considerably worse properties. Articles coated with polyurethane layers as, for instance, containers or work pieces exhibit a high resistance to corrosion such as to acids and solvents especially motor oils. Moreover these layers are resistant to boiling and bacteria and hence very useful for the foodstuff and brewing industries.

Example 2

A paste consisting of a mixture of 25 g. of the polyurethane mentioned in Example 1, 5 g. of 3-chloropropyleneglycol (2)-phenylether (1) as the plasticizer, 10 g. of zinc white and 75 g. of ethylenechlorohydrin is first gelatinized at 100–110° C. by means of a kneading machine. The warm plastic mass thus obtained is applied on woven, knitted or felted fabrics of natural or synthetic filaments. After the evaporation of the ethylene-chlorohydrin one obtains a product resembling artificial leather the surface of which, if desired, may be grained or modified in any way.

Example 3

A paste produced in the manner as described in Examples 1 or 2 and being of 60% strength is molded into a block by a usual Celluloid boiling press at 105° C. The block may be divided into foils of any thickness and used as such or applied to any surface in a known manner. The foils may also be wound round pipes, rods or the like whereupon the edges thereof are united with one another.

By the process of the present invention pipes may be produced from polyurethane. For the production thereof it is also possible to work up the paste mentioned above directly into a pipe at 105° C. by means of a press as known in the manufacture of Celluloid or into profile pieces on corresponding change of the mouthpiece.

I claim:

A paste consisting of a mixture of 25 grams of the polyurethane melting at 188–190° prepared by condensing alpha omega hexanediisocyanate with 1.4 butylene glycol, 5 grams of 3-chloropropylene-glycol (2)-phenylether (1) as the plasticizer, 10 grams of zinc white, and 75 grams of ethylene-chlorohydrin.

KURT THINIUS.